(12) United States Patent
Herdt et al.

(10) Patent No.: US 9,010,054 B2
(45) Date of Patent: Apr. 21, 2015

(54) STRUCTURAL INSULATED BUILDING PANEL

(75) Inventors: Julee Ann Herdt, Boulder, CO (US); Kellen Scott Schauermann, Lafayette, CO (US)

(73) Assignee: Biosips, Inc., Boulder, CO (US)

( * ) Notice: Subject to any disclaimer, the term of this patent is extended or adjusted under 35 U.S.C. 154(b) by 0 days.

(21) Appl. No.: 13/524,563

(22) Filed: Jun. 15, 2012

(65) Prior Publication Data

US 2012/0317923 A1    Dec. 20, 2012

Related U.S. Application Data

(60) Provisional application No. 61/497,340, filed on Jun. 15, 2011.

(51) Int. Cl.

| | |
|---|---|
| *E04C 2/284* | (2006.01) |
| *E04C 2/296* | (2006.01) |
| *E04B 1/80* | (2006.01) |
| *E04C 2/34* | (2006.01) |
| *B29C 44/12* | (2006.01) |
| *E04C 2/20* | (2006.01) |
| *E04C 2/32* | (2006.01) |

(52) U.S. Cl.
CPC ............ *E04B 1/80* (2013.01); *E04C 2/3405* (2013.01); *B29C 44/1214* (2013.01); *E04C 2/205* (2013.01); *E04C 2/296* (2013.01); *E04C 2/322* (2013.01)

(58) Field of Classification Search
CPC ......... E04C 2/322; E04C 2/3405; E04C 2/06; E04C 2/205; E04C 2/243; E04C 2/292
USPC ............ 52/220.1, 220.2, 220.3, 220.4, 220.5, 52/220.7, 220.8, 309.7, 309.16, 586.1, 52/586.2, 588.1, 783.1, 783.11, 783.17, 52/783.19, 309.9, 309.11, 309.15, 309.17, 52/784.15, 798.1, 336
See application file for complete search history.

(56) References Cited

U.S. PATENT DOCUMENTS

| | | | | |
|---|---|---|---|---|
| 1,649,577 | A | * | 11/1927 | Coryell ........................ 52/691 |
| 2,022,255 | A | * | 11/1935 | Scott ......................... 52/585.1 |
| 2,049,863 | A | * | 8/1936 | Palmer .......................... 52/272 |
| 2,101,090 | A | * | 12/1937 | Palmer .......................... 52/210 |
| 2,616,283 | A | * | 11/1952 | Branstrator et al. ............ 52/408 |
| 2,641,029 | A | * | 6/1953 | Trimmer ..................... 52/288.1 |
| 2,839,812 | A | * | 6/1958 | Berliner ......................... 264/72 |
| 2,934,934 | A | * | 5/1960 | Berliner ......................... 52/601 |
| 2,991,855 | A | * | 7/1961 | Buell et al. ................... 52/481.1 |
| 3,341,395 | A | * | 9/1967 | Weber .......................... 428/134 |

(Continued)

*Primary Examiner* — Robert Canfield
(74) *Attorney, Agent, or Firm* — Dorsey & Whitney LLP (57) ABSTRACT

A structural insulated panel is composed of a structural member in a corrugated form and a cohering, insulating filler material. The structural member has a plurality of front surfaces spaced laterally apart from each other and a plurality of back surfaces spaced laterally apart from each other and spaced apart in depth from the front surfaces. The structural member has a plurality of chord panels which span between corresponding edges of respective pairs of the front surfaces and the back surfaces. Chase channels are formed between adjacent pairs of the cord panels and one of the front surfaces or one of the back surfaces. Each chord panel defines a plurality of apertures. The filler material fills the chase channels, binds to the front surfaces, back surfaces, and chord panels, and extends through the apertures in each of the cord panels to structurally connect the filler material in adjacent chase channels.

22 Claims, 7 Drawing Sheets

(56) References Cited

U.S. PATENT DOCUMENTS

| | | | | |
|---|---|---|---|---|
| 3,397,497 A * | 8/1968 | Shea et al. | ............ | 52/334 |
| 3,481,643 A * | 12/1969 | Campbell | ............ | 296/204 |
| 3,496,691 A * | 2/1970 | Seaburg et al. | ............ | 52/336 |
| 3,519,523 A * | 7/1970 | Rodman et al. | ............ | 428/53 |
| 3,604,164 A * | 9/1971 | Mason | ............ | 52/206 |
| 3,657,849 A * | 4/1972 | Garton | ............ | 52/91.1 |
| 3,812,636 A * | 5/1974 | Albrecht et al. | ............ | 52/334 |
| 3,969,563 A * | 7/1976 | Hollis, Sr. | ............ | 428/175 |
| 3,970,324 A * | 7/1976 | Howat | ............ | 280/610 |
| 4,037,379 A * | 7/1977 | Ozanne | ............ | 52/404.3 |
| 4,263,752 A * | 4/1981 | Jungbluth | ............ | 49/501 |
| 4,346,541 A * | 8/1982 | Schmitt | ............ | 52/309.11 |
| 4,453,364 A * | 6/1984 | Ting | ............ | 52/630 |
| 4,490,958 A * | 1/1985 | Lowe | ............ | 52/634 |
| 4,517,782 A * | 5/1985 | Shamszadeh | ............ | 52/309.7 |
| 4,593,449 A * | 6/1986 | Meray-Hovarth et al. | ............ | 29/527.1 |
| 4,726,707 A * | 2/1988 | Newton | ............ | 404/25 |
| 4,832,308 A * | 5/1989 | Slonimsky et al. | ............ | 249/78 |
| 4,832,309 A * | 5/1989 | Derby-Lewis | ............ | 249/99 |
| 4,885,892 A * | 12/1989 | Gooding | ............ | 52/690 |
| 5,165,213 A * | 11/1992 | Finch et al. | ............ | 52/588.1 |
| 5,349,749 A * | 9/1994 | Fiedler | ............ | 29/897 |
| 5,551,204 A * | 9/1996 | Mayrand | ............ | 52/795.1 |
| 5,600,928 A * | 2/1997 | Hess et al. | ............ | 52/309.4 |
| 5,771,645 A * | 6/1998 | Porter | ............ | 52/220.2 |
| 5,927,032 A * | 7/1999 | Record | ............ | 52/309.11 |
| 6,148,586 A * | 11/2000 | Jandl | ............ | 52/783.17 |
| 6,167,624 B1 * | 1/2001 | Lanahan et al. | ............ | 29/897.32 |
| 6,205,728 B1 * | 3/2001 | Sutelan | ............ | 52/309.7 |
| 6,260,323 B1 * | 7/2001 | Hockey | ............ | 52/481.1 |
| 6,418,686 B1 * | 7/2002 | Record | ............ | 52/309.15 |
| 6,773,791 B1 | 8/2004 | Ruggie et al. | | |
| 6,857,241 B1 * | 2/2005 | Pellicer | ............ | 52/583.1 |
| 6,871,600 B2 * | 3/2005 | Norton et al. | ............ | 105/404 |
| 7,077,988 B2 | 7/2006 | Gosselin | | |
| 7,127,856 B2 * | 10/2006 | Hagen et al. | ............ | 52/309.9 |
| 7,168,216 B2 * | 1/2007 | Hagen, Jr. | ............ | 52/480 |
| 7,416,775 B2 * | 8/2008 | Snel | ............ | 428/178 |
| 8,028,483 B2 * | 10/2011 | Carolan | ............ | 52/404.1 |
| D652,956 S * | 1/2012 | Tanaka et al. | ............ | D25/138 |
| 8,393,129 B2 * | 3/2013 | Arsene et al. | ............ | 52/783.17 |
| 8,613,180 B2 * | 12/2013 | Strickland et al. | ............ | 52/742.13 |
| 2002/0088199 A1 * | 7/2002 | Linn | ............ | 52/745.19 |
| 2003/0029133 A1 * | 2/2003 | Czachor et al. | ............ | 52/783.19 |
| 2003/0041547 A1 * | 3/2003 | Gosselin | ............ | 52/630 |
| 2004/0074206 A1 * | 4/2004 | Tanase et al. | ............ | 52/783.17 |
| 2007/0227086 A1 * | 10/2007 | Beavers et al. | ............ | 52/309.7 |
| 2009/0000246 A1 * | 1/2009 | Chang | ............ | 52/783.11 |
| 2011/0099927 A1 * | 5/2011 | Garcia Viar | ............ | 52/220.2 |
| 2011/0113725 A1 * | 5/2011 | Garry | ............ | 52/838 |
| 2012/0085062 A1 * | 4/2012 | Neumayr | ............ | 52/578 |

* cited by examiner

STRUCTURAL INSULATED BUILDING PANEL

CROSS REFERENCE TO RELATED APPLICATIONS

This application claims the benefit of priority pursuant to 35 U.S.C. §119(e) of U.S. provisional application no. 61/497,340 filed 15 Jun. 2011 entitled "Structural insulated building panel," which is hereby incorporated herein by reference in its entirety.

TECHNICAL FIELD

The technology described herein relates to structural building panels and in particular to a structural insulated building panel, commonly referred to as a SIP.

BACKGROUND

Structural building panels have long been used to facilitate modular construction of buildings. The use of structural building panels facilitates the rapid construction of buildings because these prefabricated panels reduce onsite construction time while contributing a higher level of precision to the overall building assembly. In order to increase thermal efficiency of structures constructed from structural building panels, while yielding thermally-sound building systems, insulation may be incorporated with the building panels. The incorporation of insulation provides a structural insulated panel, or "SIP." Structural insulated building panels are often used in construction; however, such currently-existing SIPs suffer from various deficiencies.

For example, one type of structural insulated building panel is a stressed-skin panel. The structural members (i.e., the skins) form a shell that encapsulates and is often glued to the insulation. Most of the stress on the panels is borne by this structural shell. This is not the most efficient means of bearing stress because it results in material redundancy and waste, increased labor and shipping expenses, and an overall low strength-to-weight ratio. Many stressed-skin SIPs are fabricated using oriented strand board ("OSB") as their outer skins. OSB is manufactured using materials including chemicals that damage the environment and the health of living organisms. Additionally, OSB stressed-skin panels have limited flexibility in their application due to their rigidity and two-dimensional nature. Using OSB as an outer SIP surfacing material presents difficulties with incorporating and integrating construction components, for example, conduit and wiring, plumbing, and framing members into and through the OSB surface. Further, many OSB stressed-skin panels offer limited aesthetic possibilities due to the non-flexible nature of OSB, its unappealing appearance, and because OSB should be covered or encapsulated and not left exposed as a finish material because gasses from the aforementioned chemicals may leach into the living environment.

The information included in this Background section of the specification, including any references cited herein and any description or discussion thereof, is included for technical reference purposes only and is not to be regarded as subject matter by which the scope of the invention is to be bound.

SUMMARY

The technology disclosed herein is a structural insulated building panel that facilitates new architectural, structural, and aesthetic possibilities through the ability to be easily configured into complex shapes, sizes, and arrangements not currently available using standard SIPs or other building materials. The disclosed SIP is a high strength-to-weight, structural insulated building panel that is a load-bearing, versatile, and environmentally friendly component for wall, floor, roof, ceiling, and interior applications. The SIP includes a chemically-inert, fiber-based material that is used as the three-dimensional structural core member, skin, and for other components. The structural core member may also be formed from standard and/or conventional construction materials and feedstock. The structural member allows for achievement of flat, multi-faceted, compound curve, trapezoidal, or any variety of panel and building shapes. The material composition of the structural member provides a flexible, strong, and easily manipulable planar sheet that may be formed into complex structural shapes with varying thicknesses. The sheets may be engineered, molded, and shaped using fiber science principals combined with computer-aided manufacturing and other fabrication techniques including standard machining and tooling. In other implementations, standard fiberboard or pressboard may be used.

The core of the panel is a structural member that may have parallel or non-parallel, longitudinal, latitudinal, or any variety or direction of manipulations in order to yield folds and bends and resultant three-dimensional panel shapes, configurations, and thicknesses. The three-dimensional core may further have framing extensions, also made of the structural material, at some or all edges. The panel core may be integrated with separate end plates that attach to the top and bottom of the core through various fastening options. In one implementation, slotted connections are formed on the end plates that interface with receiving tabs on the panel core. The core may have integrated binding extensions for attachment to surrounding construction members. The core may be perforated with holes, notches, and voids of various dimensions to allow for application and attachment of insulation as well as for routing of building utilities, for example, conduit, wiring, and pipes. The core may be bisected or otherwise intersected by cross-members which provide for structural augmentation and utility routing. These cross-members may be arranged in horizontal, vertical, and lateral directions across the core and they may contribute to the overall structural integrity of the SIP.

The panel components including core, skin(s), framing extensions at some or all edges, end plates, binding tabs, and cross-members may all be fabricated from high- or low-grade fiber sources. These components, especially the core and cross-members, may be of various three-dimensional configurations, thicknesses, angles, and overall shape to yield specifically-desired performance, fabrication, and manufacturing characteristics. These components can integrate in various assemblages in order to perform as columnar, diaphragmatic, and/or lateral support systems which bear structural forces more efficiently than stressed-skin SIPs (which carry the majority of structural forces through their facing surfaces.) The core and cross-members may be integrated in various manners with a range of insulation material types, all of which—core, cross-members, and insulation—may be covered with a lightweight fiber skin on one or both sides. The fiber skins may contribute to the overall structural integrity of the panel.

When compared to standard SIPs, the core also provides increased contact surface with the insulation, thereby yielding a SIP with greater structural integrity. In one implementation, the core may be perforated with foaming holes. These holes allow for controlled dispersion, distribution, and securing of expanded foam insulation in large, continuous expanses throughout, along, and around the three-dimensional core of the panel. Various expanded foam insulation materials are able to bond with the fiber material components of the core and skin through naturally-occurring hydrogen bonds. This results in a SIP with superior strength, especially when compared to glued-insulation SIP systems. In embodiments in which cross-members and top and bottom plates are integrated with the core, the cross-member and top and bottom plates further increase the available contact points between insulation and the core, resulting in a yet stronger panel.

Distribution of insulation around the structural core also yields a SIP with superior thermal performance. This is due to the three-dimensional nature of the core which prohibits straight paths of thermal transfer and moisture movement across the panel thickness. Standard SIPs are comprised of flat OSB boards which sandwich a layer of insulation resulting in a straight path of thermal transfer and no thermal break between insulation and outer skins.

The panels may be configured to have higher strength-to-weight characteristics than other structural panel systems due in part to the fabrication from three-dimensional fiber technology and/or computer-aided manufacturing (CAM) methods, or both, as opposed to traditional, flat, stressed-skin SIP panels which are typically fabricated with OSB outer skins.

The core, panel faces, auxiliary components, and overall configurations, as shown in various exemplary embodiments, aid in facilitating the construction of a building since they are configured in standard building material sizes that allow easy integration with standard building modules and methods. An exemplary panel is configured to be versatile to comply with standard construction code requirements and construction techniques. However, the panel construction also allows for easy site and/or factory customization for integration with non-standard-sized building configurations.

Perforations, cut-outs, routing holes, cross-members, and digitally-produced markings in the three-dimensional structural core (and in the auxiliary components) may offer unique and easy methods for addition and/or deletion of building elements, such as electrical conduit, electrical boxes, plumbing, mechanical, communication systems, smart materials, computer systems, auxiliary structural members, and structural insulated panel connectors.

Building elements can be integrated into or removed from the panel before, simultaneously with, or after the deposition of insulation, and these integrations, and/or modifications to these integrations, may also take place on building sites during or after panel installation as part of a building system. Unlike standard SIPs that depend on large areas of uninterrupted OSB skin adhered to insulation for structural integrity, the panel allows disruption of the integral sheet of insulation and skin surface without compromising the structural integrity of the panel.

In one exemplary implementation, a structural insulated panel may be composed of a structural member in a corrugated form and a cohering, insulating filler material. The structural member may have a plurality of front surfaces spaced laterally apart from each adjacent front surface. The structural member may also have a plurality of back surfaces spaced laterally apart from each adjacent back surface and spaced apart in depth from the plurality of front surfaces. The structural member may further have a plurality of chord panels, each of which spans between corresponding edges of respective pairs of one of the front surfaces and one of the back surfaces. A plurality of chase channels may be formed between adjacent pairs of the chord panels and a respective one of the front surfaces or a respective one of the back surfaces. Each of the chord panels may define a plurality of apertures along a length of the chord panels configured to substantially equalize a filling pressure within and between the chase channels. The cohering, insulating filler material may substantially fill the chase channels, bind to the front surfaces, back surfaces, and chord panels, and extend through the apertures in each of the chord panels to structurally connect the cohering, insulating filler material in adjacent chase channels.

In another implementation, an exemplary method for constructing a structural insulated panel is disclosed. A structural member may be formed into a corrugated configuration. The structural member may be defined by a plurality of front surfaces spaced laterally apart from each adjacent front surface; a plurality of back surfaces spaced laterally apart from each adjacent back surface and spaced apart in depth from the plurality of front surfaces; a plurality of chord panels each of which spans between corresponding edges of respective pairs of one of the front surfaces and one of the back surfaces; and a plurality of chase channels composed of adjacent pairs of the chord panels and a respective one of the front surfaces or a respective one of the back surfaces. A plurality of apertures may be formed within each of the plurality of chord panels. The plurality of chase channels may be filled with a cohering, insulating filler material such that the cohering, insulating filler material extends through the apertures in each of the chord panels to substantially equalize a filling pressure within and between the chase channels and to structurally connect the cohering, insulating filler material in adjacent chase channels.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. A more extensive presentation of features, details, utilities, and advantages of the present invention is provided in the following written description of various embodiments of the invention, illustrated in the accompanying drawings, and defined in the appended claims.

DETAILED DESCRIPTION

One embodiment of a structural insulated building panel, or structural insulated panel ("SIP") 10, is disclosed in conjunction with FIGS. 1-4. The SIP 10 is configured to be a sustainably designed, high strength-to-weight, three-dimensional core, structural insulated panel. The SIP 10 may include any components configured to provide columnar, lateral, diaphragmatic, eccentric loading, and other measures of structural support in a building within which SIP 10 is incorporated. Such exemplary structural support provides greater strength and more thermal-efficiency in the disclosed SIP 10 than is provided by other structural insulated panel systems.

In certain embodiments, the SIP 10 is configured to be compatible with standard United States construction material modules and to comply with code-required placements of electrical outlets, switch plates, and other construction elements. In still other embodiments, the SIP 10 is configured to be connectable to other standard building modules and materials to facilitate the construction of the building. For example, the SIP 10 may be configured to be a four-foot by eight-foot SIP panel of wood-, aluminum-, or steel-frame, or other composite building system. In other embodiments, the SIP 10 may be configured to have any three-dimensional shape that is specified for a particular building project. An exemplary SIP 10 may be pre-formed before site delivery according to desired dimensions and/or it may be cut, or otherwise shaped at a building site in order to conform to a particular building performance requirement, aesthetic, or specification.

Figure 1:
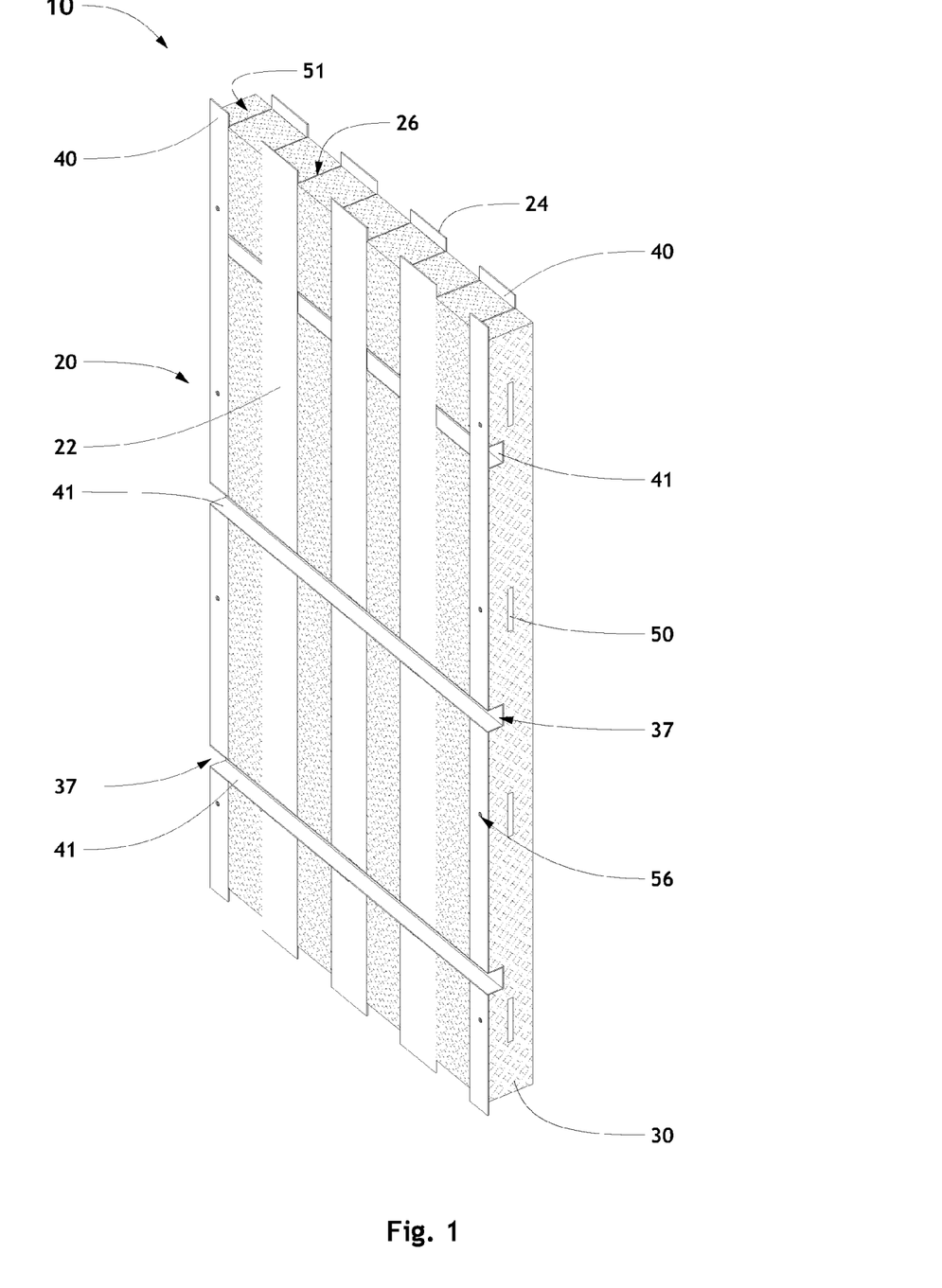
FIG. 1 is an isometric view of an embodiment of a structural insulated panel showing both open and partially closed cross-members.
Figure 2:
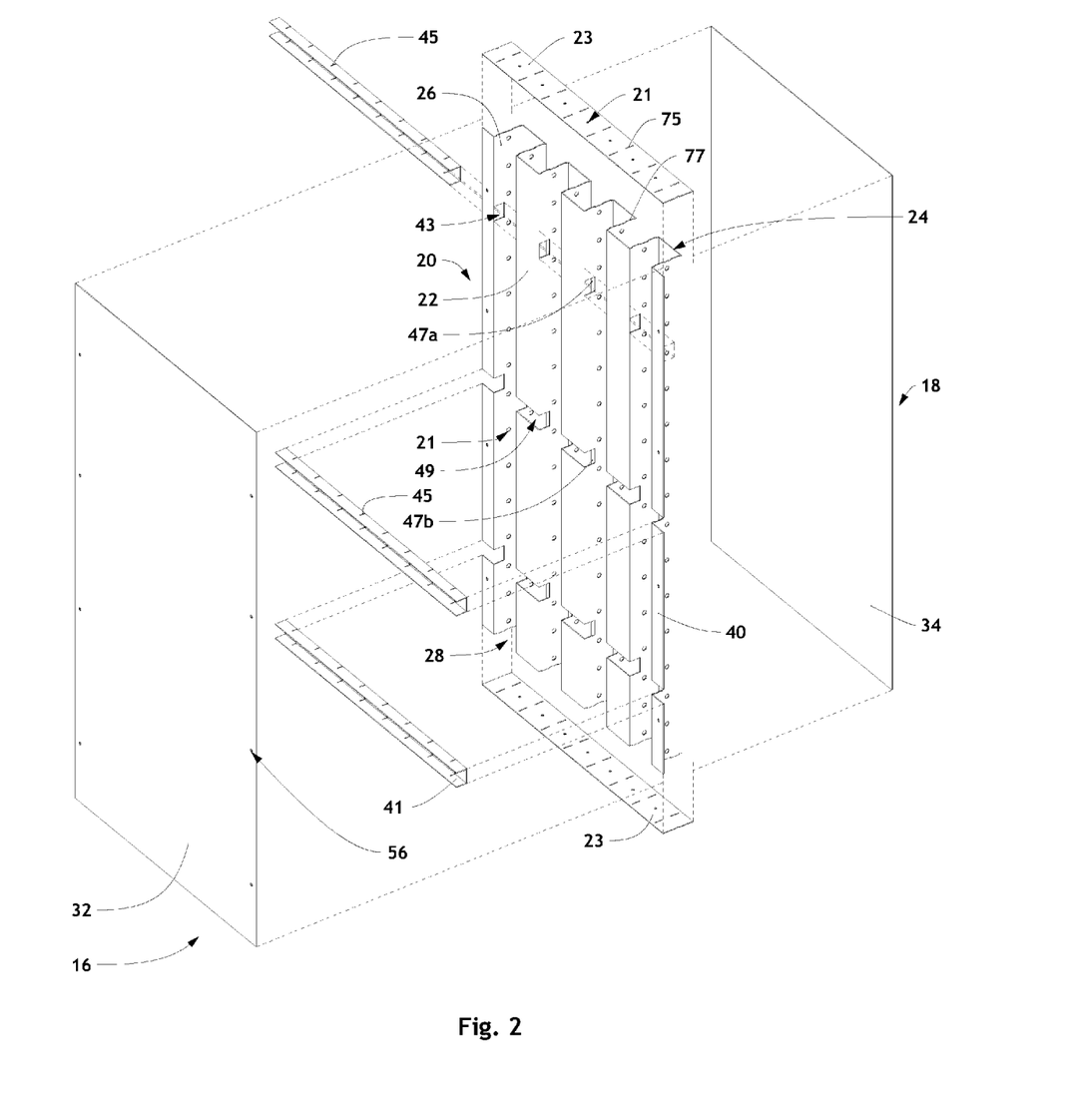
FIG. 2 is an exploded isometric view of an exemplary embodiment of the components of a panel including a core, skins, framing extensions, end plates, insertion voids for installing cross-members, and cross-members.
Figure 3:
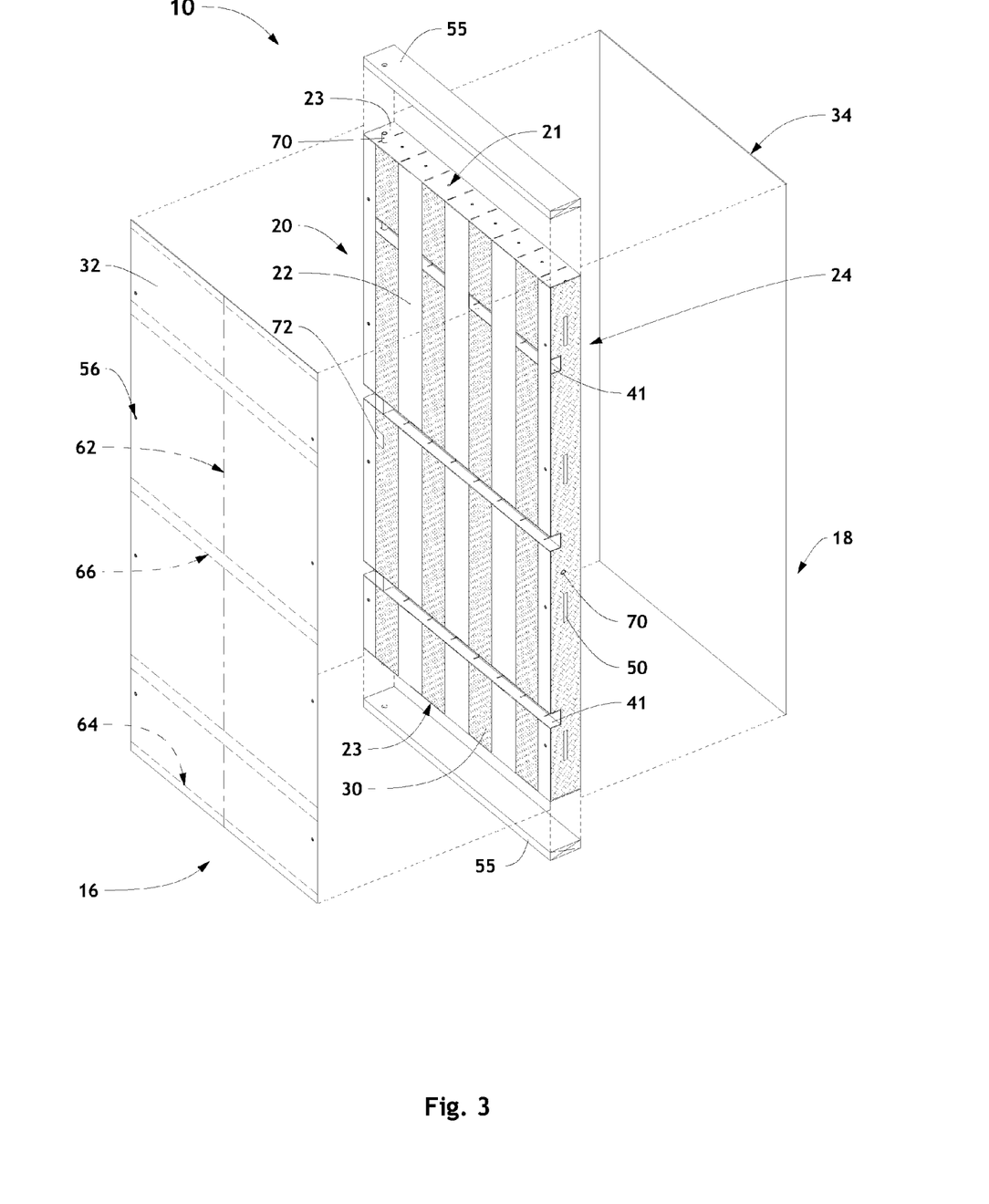
FIG. 3 is an exploded isometric view of an exemplary embodiment of a structural insulated panel without panel skins, but with both open and partially closed cross-members, end plates, insulation integrated with the core, and panel skins removed.

In reference to FIGS. 1, 2, and 3, the SIP 10 is formed of a high strength-to-weight SIP with three-dimensional structural member core ("core") 20, panel insulation 30, and a front skin 32 and a back skin 34 mounted to an interior surface 16 and an exterior surface 18, respectively. Additional components of the SIP 10 may include one or more of the following: structural connection components 50, framing extensions 40, chord members ("chords") 26, cross members 41, framing notches/cross-member voids 37, front facing surfaces ("front surfaces") 22, back facing surfaces ("back surfaces") 24, end plates 23, foaming holes 21, insertion voids 43, and other building utilities, e.g., electrical conduit 70 and electrical boxes 72.

The front surfaces 22, the back surfaces 24, and the chords 26 may be configured to form chases 28 in the SIP 10. In such embodiments, the front surfaces 22 may be parallel to the back surfaces 24, and the chords 26 are configured to connect the front surfaces 22 and the back surfaces 23. The chases 28 may be configured to allow utilities to be disposed within the SIP 10 and/or to allow other SIPs 10 or building components to interface with the SIP 10. The chases 28 may be of varying widths within the structural core 20. The interior surface 16 may be configured to be approximate to the interior of a building, and the exterior surface 18 is configured to be approximate to the exterior of a building. The SIPs 10 may have insulation and may have skins 32, 34 attached to front surfaces 22 and back surfaces 24.

As shown in FIGS. 2 and 3, cross members 41 may be installed laterally within the SIP 10 and perpendicular to the orientation of the vertical chases 28. In one embodiment, the cross members 41 may fit within insertion voids 43 formed within the chords 26 and behind the front surfaces 22. The cross members 41 may be installed in a SIP 10 by sliding them laterally through a series of insertion voids 43 formed at a common height within adjacent chords across the SIP 10. The cross members 41 may be formed as U-shaped channels with flat sidewalls that meet perpendicularly with a flat base wall. The cross members 41 may define a series of vertically oriented notches 45 within the base wall that extend partially within the sidewalls and that are spaced apart to interface with the chords 26 at the location 47a of the voids. In this embodiment, the cross members 41 may be of the same cross-sectional shape and size as the voids 43, but when pushed against the chords 26 to interlock the notches, the cross members 41 are recessed behind the plane of the front surfaces 22.

In an alternate embodiment, the voids may be in the form of recesses 49 formed within both the front faces 22 and the adjacent chords 26. The cross members 41 may be installed in a SIP 10 by pushing the cross member 41 into a series of recesses 49 formed at a common height and depth within adjacent chords across the SIP 10. The cross members 41 may be formed as U-shaped channels with flat sidewalls that meet perpendicularly with a flat base wall. The cross members 41 may further define a series of vertically oriented notches 45 within the base wall that extend partially within the sidewalls and that are spaced apart to interface with the chords 26 at the location 47b of the recesses 49. In this embodiment, the cross members 41 may be of slightly larger depth than the cross-sectional depth of the voids 43, but when pushed against the chords 26 to interlock the notches 45, the cross members 41 become flush with the plane of the front surfaces 22.

The cross members may be used to provide additional structural rigidity and strength to the SIP 10 for increased resistance to shear, torsion, and other structural forces. The cross-members 41 may also provide access for routing electrical wiring, plumbing, mechanical structures, communication wiring, computer wiring, or auxiliary structural members that can be either completely open and accessible from front or side, or partially open and with structural bracing inserts, and access from the side.

In another embodiment as shown in FIG. 2, the chords 26 of the structural member 20 may form tabs 77. The end plates 23 may define complementary notches 75 within which the tabs 77 are inserted when the end plates 23 are placed upon the top and bottom of the structural member 20. The interface between the notches 75 and tabs 77 provides an attachment structure between the end plates 23 and the structural member 20 and additional strength to the SIP 10.

Figure 4:
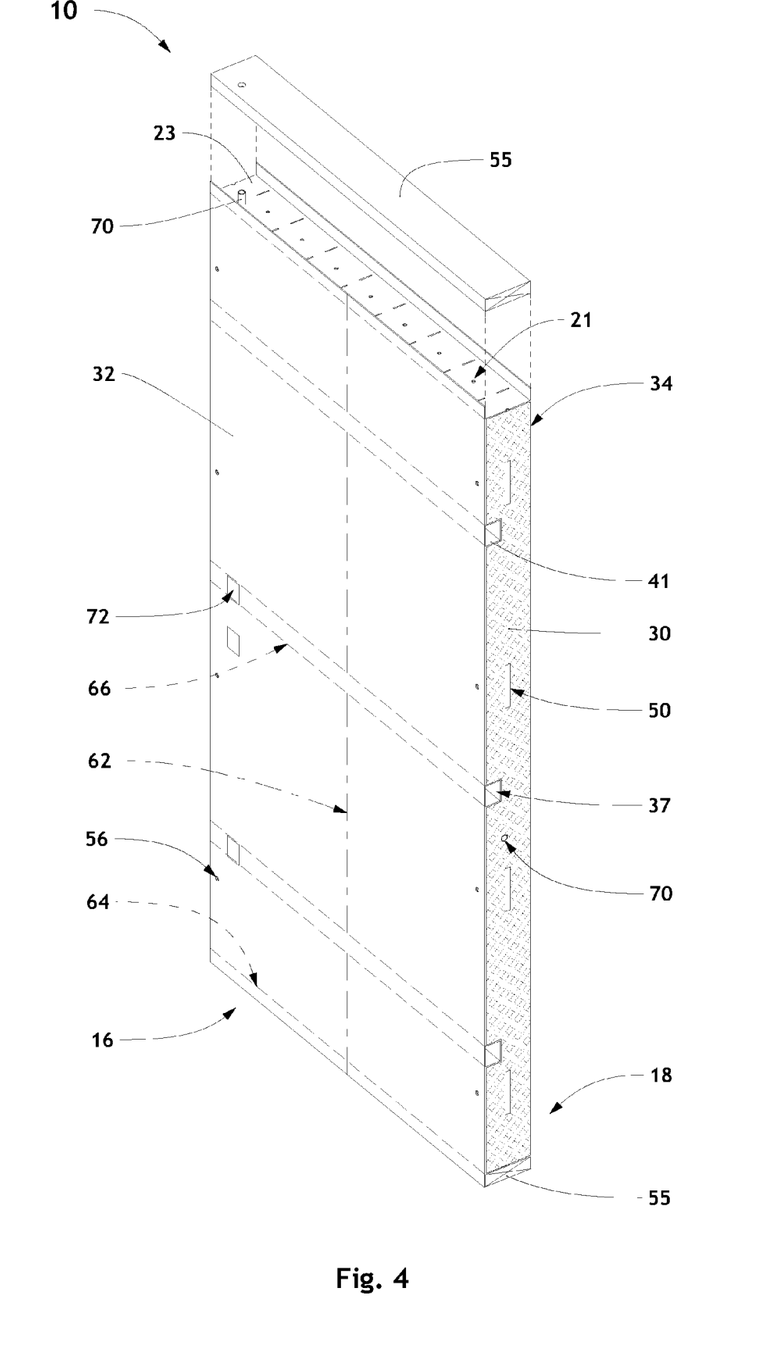
FIG. 4 is an isometric view of an exemplary embodiment of a structural insulated panel with cross-members, end plates, insulation, and skin integrated with the core.
Figure 5:
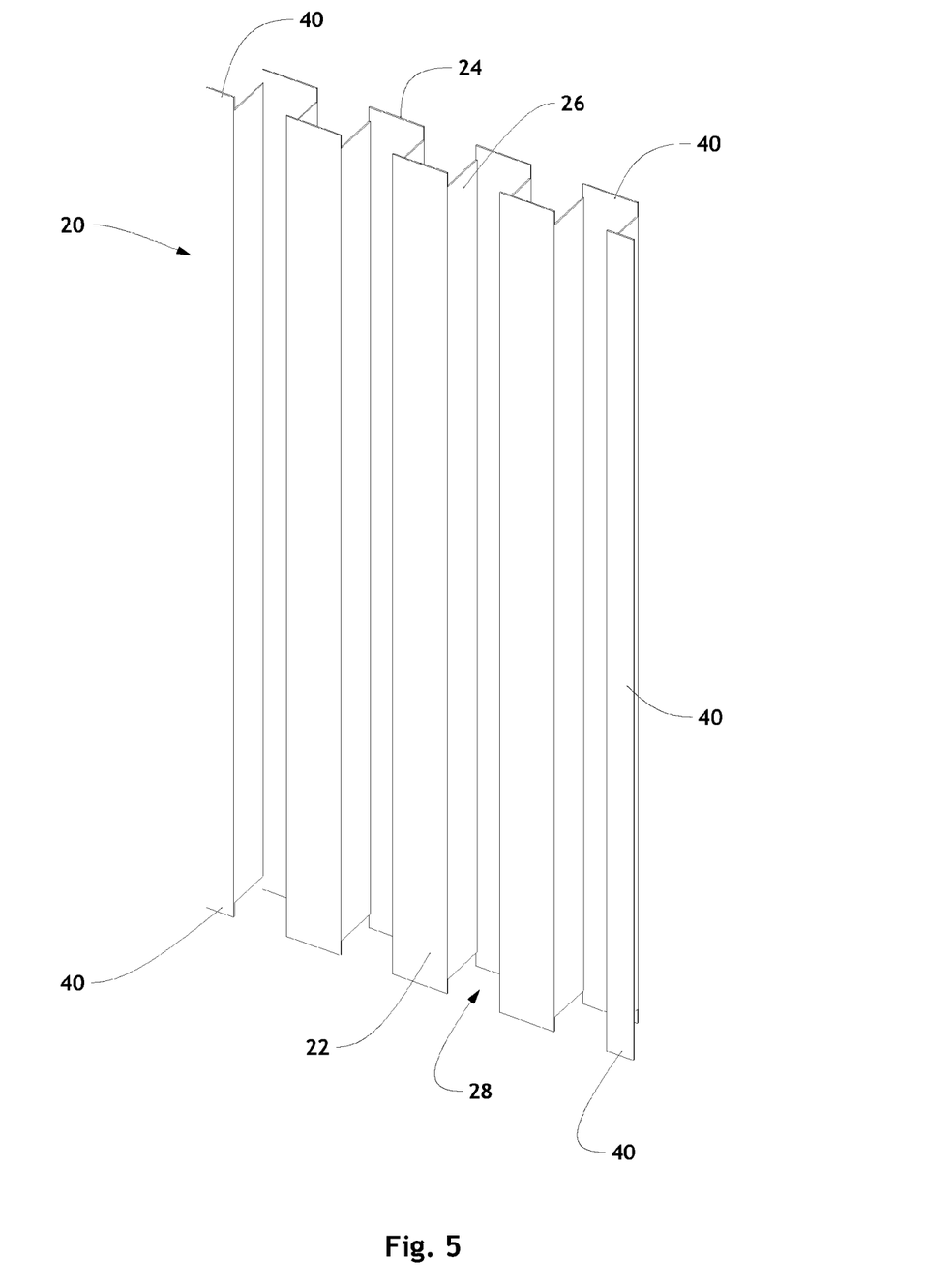
FIG. 5 is an isometric view of an embodiment of a structural insulated panel core with framing extensions at all edges.

In a further embodiment shown in FIGS. 1 and 5, the lengths of the front surfaces 22 and back surfaces 24 may be greater than the lengths of the chords 26 to form framing extensions 40 that thereby define segmented channels 51 along the top and bottom of the SIP 10. An end plate 23 may form the base of a segmented channel 51 or, alternatively, there may be no end plate 23 positioned on the top or bottom of the structural member 20. The segmented channels 51 may receive standard framing members 55, e.g., 2-x-4 studs (see FIGS. 3 & 4 showing framing members 55 in an alternate configuration), for additional structural support or integration into a standard wall frame.

In other embodiments, the structural member 20 may be produced and/or formed by any number of manufacturing processes. For example, the structural member 20 may be molded or otherwise shaped through engineered fiber processes combined with computer-aided manufacturing (CAM). In another example, the structural member 20 may be produced using pressing processes, cold forming processes, extrusion processes, and/or folding and other multiple combinations of three-dimensional shaping. In further embodiments, the structural member 20 may be produced in any manner that is operative to produce a structural member 20 that will provide sufficient strength to the SIP 10.

In an exemplary embodiment, the structural member 20 may have parallel or non-parallel, longitudinal, latitudinal, or any variety or direction of manipulations for creating three-dimensional latitudinal folds and bends resulting in three-dimensional panel shapes, configurations, and thicknesses. The structural member 20 may comprise any cross-sectional shape and configuration that facilitates the structural support of a building, facilitates the construction of a building, and/or facilitates the inclusion of electrical and other building utilities, fastening components, auxiliary structural members, building furnishings or accessories, or other construction devices within the SIP 10.

Figure 6:
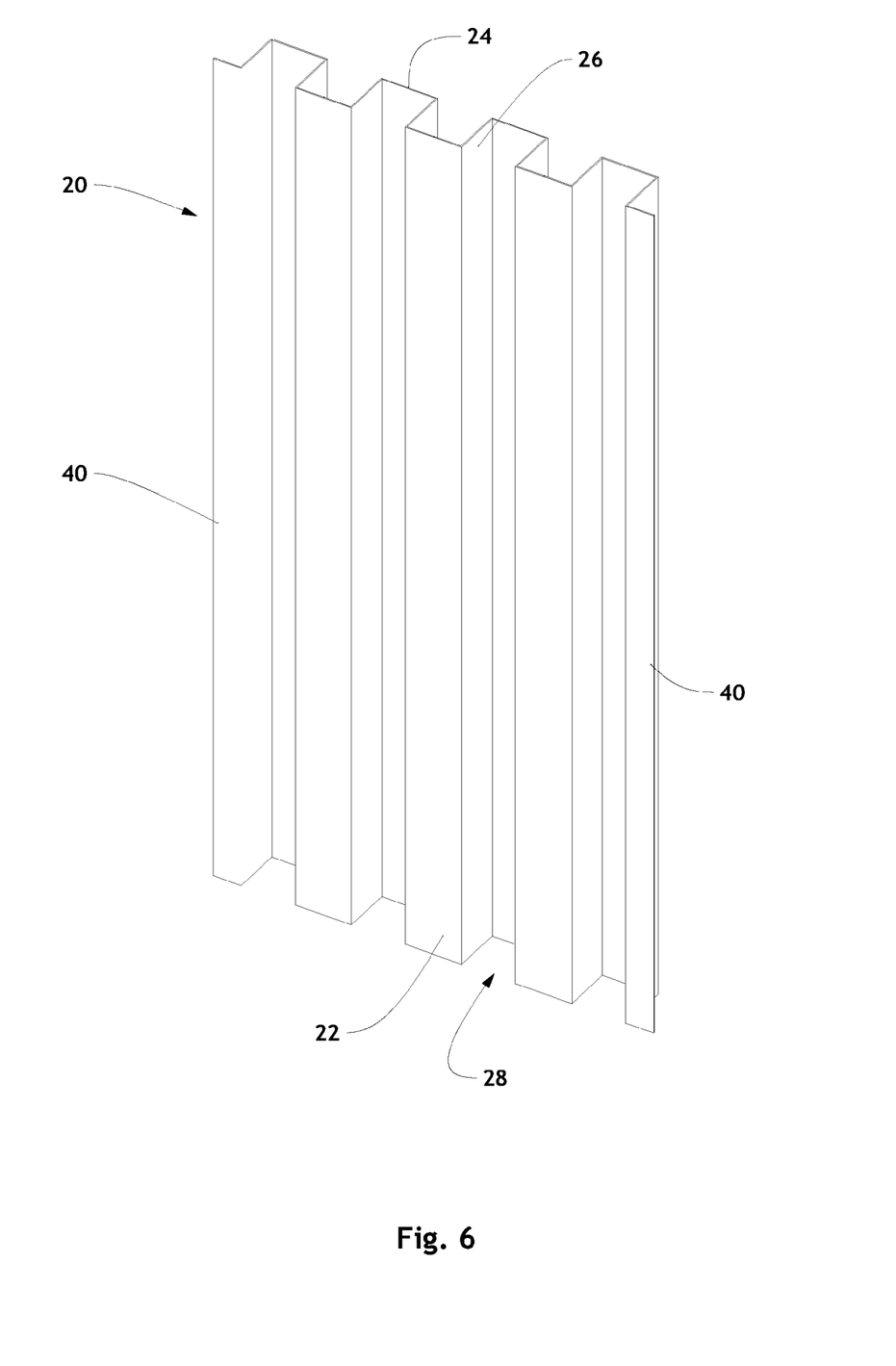
FIG. 6 is an isometric view of an embodiment of a structural insulated panel core with framing extensions extending along only two edges of the core.
Figure 7:
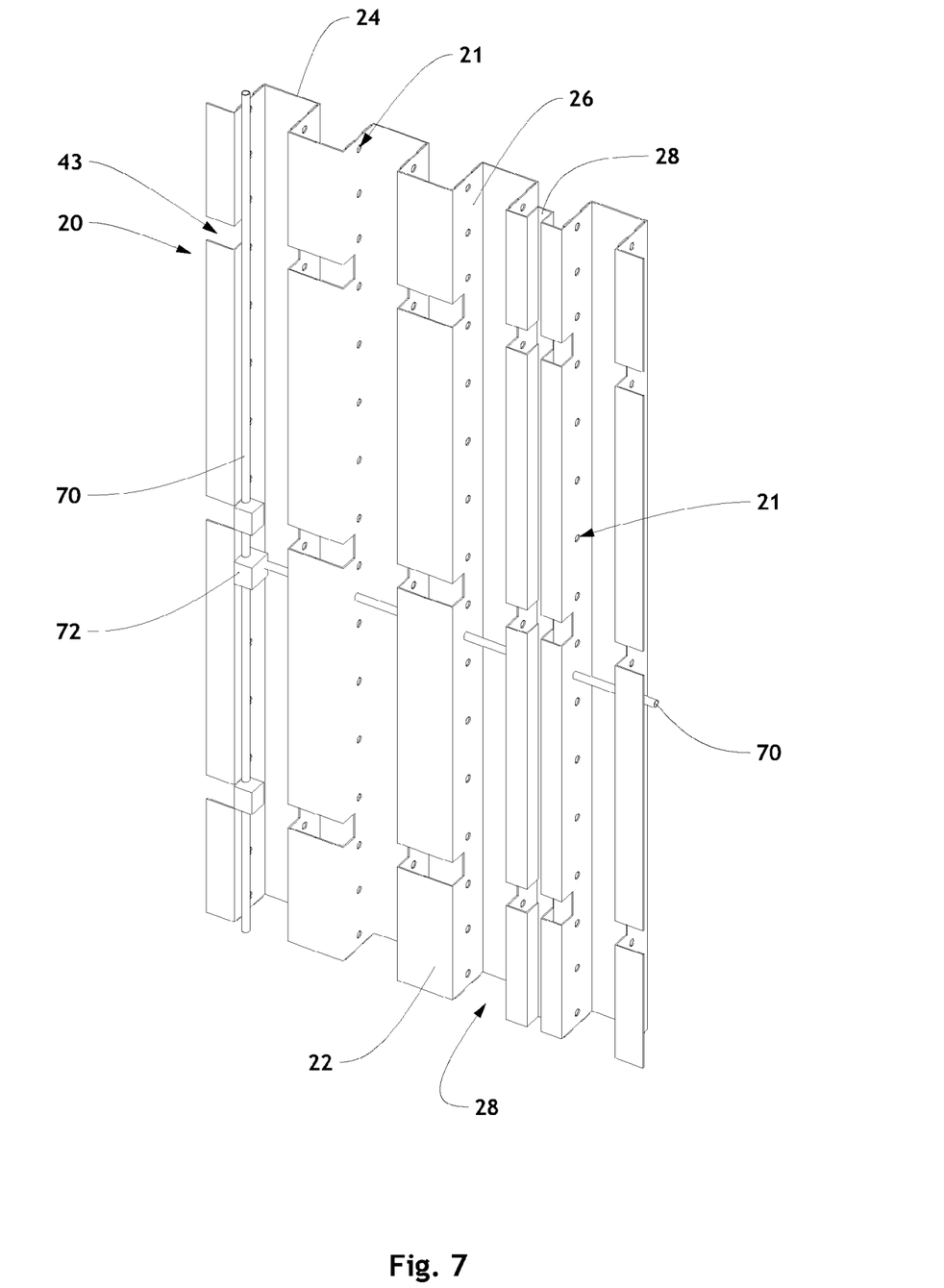
FIG. 7 is an isometric view of an exemplary embodiment of a structural insulated panel core with foaming holes, notches, folds, and voids for application and attachment of cross-members, end plates, insulation, framing members, and building utilities.

As shown in FIGS. 5-7, the structural member 20 may be configured to have a corrugated cross-sectional shape. The structural member 20 may comprise a structural column, beam, lateral, diaphragmatic, or other structural system. According to another embodiment of the invention, structural member 20 may comprise any structure that provides support to a building and/or structure within which SIP 10 is incorporated. Such high strength-to-weight structural support is generally greater and more efficient than the support provided by standard structural insulated panels.

As shown in the exemplary embodiment of FIG. 7, the structural member 20 may be configured to have a regular- or irregular-shaped, three-dimensional cross-section, for example, square, trapezoidal, accordion, folded, sinusoidal, square-wave, triangular, and/or other geometries for achieving multi-faceted, compound curve, trapezoidal, or a variety of other building configurations.

The structural member 20 may be configured to be used in connection with standard U.S. or other jurisdictional construction material sizes or modules. For example, front surfaces 22 may be spaced twelve inches, sixteen inches, or twenty four inches apart, as measured from centerline 62 to the centerline of a neighboring front surface 22. The front surfaces 22 and back surfaces 24 may be spaced at any interval and may be configured to be any width that facilitates the construction of a building, the assembly of the SIP 10, and/or the strengthening of the SIP 10.

The SIP 10 may be formed by combining the structural member 20 with panel insulation 30. The panel insulation 30 may be configured to be disposed within the chases 28 or on the panel surfaces 22 and 24 in various configurations. In some exemplary embodiments, the panel insulation 30 substantially fills the chases 28, such that the panel insulation 30 is flush with the front surface 22 and the back surface 24. The panel insulation 30 may partially or completely fill the chase 28. In other embodiments, the panel insulation 30 may be covered by skins 32, 34 on one or both sides and the skins may be attached in various arrangements to the panel surfaces 22 and 24. The panel insulation 30 may be configured to allow builders and other users of the SIPs 10 to add utilities into the walls of buildings constructed from SIPs 10. For example, the panel insulation 30 may be formed with channels, voids, pockets, conduits, and chases to facilitate the addition of electrical components, HVAC, plumbing, photovoltaics, computer, communication systems, smart materials, or other components. Electrical conduit 70 can be added to the SIP 10 after the panel insulation 30 has been disposed within the chases 28.

In one implementation, the panel insulation 30 may be a cohering, insulating filler material that is internally binding or intermeshed in order to provide internal structural rigidity. The cohering, insulating filler material may further adhere to the surfaces of the structural member 20 in order to increase the strength and rigidity of the SIPs 10. In an exemplary embodiment, the panel insulation 30 may comprise biologically-based, foam insulation. In other embodiments, standard, non-biologically-based insulation may be used. In still further embodiments, the panel insulation 30 may comprise urethane, soy resin, blown cellulose, batt, spray applicable foams, polyurethane, polyethylene, loose fill, and other insulation systems and materials. In an exemplary embodiment, the panel insulation 30 may comprise any low- or high-density, poured-in-place, rigid, urethane foam product similar to expanded foam insulation from BASF Chemical. The panel insulation 30 may comprise any foam insulation certified by the Environmental Protection Agency (EPA) and/or the American Lung Association or may otherwise be formulated to reduce the amount of petroleum, preservatives, and/or chemicals within panel insulation 30. The panel insulation 30 may be foamed, pre-cut, press-fitted, or otherwise installed to conform in some configuration with chases 28.

In one exemplary implementation, the panel insulation 30 may be sprayed or otherwise introduced onto the structural member 20 in liquid form, which may then expand into a foamed state. The expanding foam insulation 30 may be introduced into the chases 28 formed between adjacent chords 26 one channel at a time or multiple channels simultaneously depending upon the configuration of the foam insulation delivery equipment used. The expanding foam insulation 30 may further have adhesive properties that aid in maintaining the corrugated form of the structural member 20 and adhering the skins 32, 34 to the front and back of the structural member 20.

In an exemplary embodiment, the structural member 20 may comprise certain components that facilitate the introduction of the panel insulation 30 into, onto, or through the structural member 20 in a specific manner. For example, as shown in FIGS. 2 and 7, insulation foaming holes 21 may be disposed within the structural member 20 and are configured to aid in distributing the panel insulation 30 throughout the structural member 20 and attaching the structural member 20 to the inward-facing surfaces of panel skins 32 and 34. The insulation foaming holes 21 may be formed along the length and centered on the depth of the chords 26 of the corrugated structural member 20. This arrangement of the foaming holes 21 distributes the foaming insulation 20 more evenly throughout the folds of the structural member 20 and reduces the potential for air pockets, which would reduce the structural integrity and load capacity of the SIPs 10.

The foaming holes 21 may also transfer the pressure of the foaming insulation 30 evenly during the insulation blowing process, thereby minimizing or eliminating occurrences of the chords 26 bowing out of linear frame due to localized excess pressure of the expanding panel insulation 30. Further, the foaming holes 21 provide contiguous lateral bridges between the foam columns formed between each pair of adjacent chords 26 and a corresponding front surface 22 or back surface 24 for increased lateral strength across the SIP 10. The front surfaces 22 and back surfaces 24 may likewise be formed with foaming holes 21 to aid in the adhesion of the panel skins 32, 34 to the structural member 20. Further, the end plates 23 may be formed with foaming holes 21 to similarly aid in the adhesion of the end plates 23 to the structural member 20.

The panel insulation 30 may be installed in access chases 28, regions, cross-members 41, and/or notches of the SIPS 10 at various depths to allow easy placement of architectural furnishings and features, as well as easy placement of standard construction materials into the SIP 10. For example, the framing notches/cross-member voids 37 formed by the cross-members within the insulation 30 may be integrated at a depth into the insulation 30 to allow insertion of standard two by four wood framing members into the insertion voids 43 of the framing notches/cross-member voids. In other embodiments, larger or smaller notches may be formed in insulation 30 to facilitate the addition of other types and sizes of construction components and building utilities.

The voids 43 and recesses 49 in the structural members 20 and the notches 45 in the cross members 41 may be produced through any number and manner of techniques such as forming, digital-methods, adding or removing material from structural member 20. In some embodiments, for example, where panel insulation 30 is distributed in liquid form over structural member 20, temporary void-creating members may be disposed within cross-member voids 43, recesses 49, and chases 28 in order to prevent panel insulation 30 from filling in the voids 43 and recesses 49.

Additional components may be disposed within the panel insulation 30 of the SIP 10. For example, as shown in FIGS. 3 and 4, electrical conduit 70 and electrical boxes 72 (or other building components) may be disposed proximate to the structural member 20 before introducing the panel insulation 30 on structural member 20. The electrical conduit 70 (or other building components) may be configured to operate in conjunction with standard electrical boxes 72 (or other corresponding building component). The electrical boxes 72 and electrical conduit 70 may be configured to position electrical boxes 72 near the surface of the interior surface 16 or the exterior surface 18 at locations corresponding to standard locations for electrical boxes to facilitate running electrical wire to electrical boxes 72 after formation of panel insulation 30.

Alternatively, the chases 28 may facilitate modification of the SIP 10 after the insulation 30 has been incorporated into the SIP 10. The panel insulation 30 may only partially fill some chases 28, thereby forming a void in the panel insulation 30. The electrical conduit 70 and electrical boxes 72 may be incorporated into SIP 10 after incorporation of the panel insulation 30 with the SIP 10. Similarly, the plumbing lines, communication lines, HVAC, other utility lines, auxiliary structural members, smart materials, or other utilities, components may be configured to reside in chases.

The SIP 10 may further comprise various components configured to facilitate the attachment of the SIP 10 to other SIPs and/or to standard wood or metal framing or other types of structural components. For example, as shown in FIGS. 1 and 5, the structural member 20 may be formed with framing extensions 40 that extend from the top and bottom edges of the structural member 20.

In further exemplary embodiments, binding inserts may be attached to the SIP 10. The binding inserts may include nail strips, L-shaped brackets, hurricane clips, custom-designed, and/or standard construction industry binding inserts. The binding inserts may be engineered, molded-fiber accessories formed of the same fiber material as the structural member 20. Alternatively, the binding materials may be standard construction accessories manufactured from fiber, metal, metal alloys, composite materials, plastics, and/or combinations thereof. The binding inserts may be any structure or material that is configured to facilitate the attachment of the SIP 10 to foundations, framing, other SIPs, and other construction components. The binding inserts may be connected to the SIP 10 or the structural member 20 in various manners. For example, the binding inserts may be foamed in place within panel insulation 10, and/or otherwise secured, connected, or attached to SIP 10 in a manner that facilitates the incorporation of the SIP 10 into various construction projects. The binding inserts may also be configured to aid roofing and other building component applications, building corner connections (custom or site built), cabinets, architectural furnishings or accessories, and other uses. Corner connections may be made using standard framing, stud-to-stud connections, cam locks, and other means of construction.

The panel may be configured with end plates 23, e.g., along the top and bottom planes, as well as panel skins 32, 34. The end plates 23 and panel skins 32, 34 may provide for the following: 1) distribution of dead and live loads from the panel 10 to adjoining assembly members; 2) containment of insulation 30 during factory or on-site installation of insulation 30; 3) protection of insulation 30 during transport to the job site; 4) protection of insulation 30 at a job site; 5) provision of an adhesion surface for gluing, mechanical, or other attachment between the pane 101 and adjoining building components; and 6) avoidance of thermal bridging, moisture transfer, and/or other chemical reactions between the panel 10 and surrounding building components.

The panel core 20 may have a full or partial skin 32, 34 on one side or two sides, or it may not have skins 32, 34 but may exist only as a structural core with or without insulation 30. In some implementations, the panel skins 32, 34 may be of a thinner, fiber material, like that which forms the corrugated core 20, than the skins of standard SIPs, which use comparatively heavy, low strength-to-weight OSB. However, the panel core 20 provides most embodiments of the SIP 10 with superior fire resistance when compared to standard SIPs because the three-dimensional structural core component 20 is substantially encapsulated within the insulation system, thus protecting it against flame spread, smoke development, fire, and heat. This gives the SIP 10 a higher hourly fire rating when compared to standard SIPs since standard SIPs have their OSB facing material (structural system) positioned to most likely face fire conditions.

The SIP 10's front surfaces 22 and/or panel skins 32 may be configured to facilitate the attachment of custom and/or standard interior finishes in order to yield an interior surface 16, also known as a "panel front." Many types of interior finishes are known in the art. For example, gypsum board, plaster, brick, wood, metal, bamboo, and other materials be used as an interior finish whether or not the SIP 10 includes a panel skin 32 for attachment of the finish material. The SIP's 10 back surfaces 24, and panel skins 34, are configured to facilitate the attachment of custom and/or standard exterior finishes in order to yield a finished exterior surface 18 or "panel back." Many types of exterior finishes are also known in the art, for example, stucco, stainless steel sheeting, fiber-cement boards, brick, fiberglass, wood, or metal siding, and the like. These may be used as an exterior finish to the SIP 10 whether or not the SIP 10 includes a panel skin 34 for attachment of the finish material. Any interior or exterior finish now known or hereafter devised that is suitable for application with the SIP 10 may be utilized.

The interior surface 16 and/or exterior surface 18, front skin 32 and back skin 34, may be required to provide structural support to the SIP 10. Thus, in certain embodiments, the interior surface 16 and/or the exterior surface 18 may comprise a skin configured to be aesthetically pleasing, structurally functional and/or a combination thereof.

FIGS. 1-3 depict connectors 50 disposed within the panel insulation 30 to facilitate the attachment of one SIP 10 to another SIP 10. In such an embodiment, the SIP 10 may have a male side 12 and a female side 14. Male connectors are disposed within the SIP 10 along the male side 12 and corresponding female connectors 14 are disposed within the SIP 10 along the female side 14. In an exemplary embodiment, the connectors 50 may be cam locks. Corresponding cam lock keyhole 56 may be disposed within the structural member 20 and/or skins 32, 34 and configured to facilitate the engagement and disengagement of male connectors 12 and female connectors 14. In another embodiment, the connectors 50 may be press-fitting members. Alternatively, the connectors 50 may be any type of connector that facilitates the attachment and separation of the SIP 10 with another SIP 10.

The SIP 10 may also be embossed etched, printed, or otherwise produced with graphic patterns or markings. The embossed patterns may be configured to facilitate traction, friction, gripping, and other handling or use of the SIPs 10 such as walking on the SIP 10 during a roof assembly or lifting the SIP into place. The graphic patterns or markings may also be provided to facilitate and direct the handling or use of the SIP 10, or to display product logo, code certification, and/or instruction and assembly directions for use of the SIP 10.

In another embodiment, the graphic patterns on the SIP 10 may also be construction assembly method markings. The construction markings may be produced through molding, embossing, printing, or other methods and are configured to facilitate the assembly and integration of SIPs 10 into the building which they form. As shown in FIGS. 3 and 4, the structural member 20 has centerline markings 62, stud markings 64, and framing notches/conduit void markings 66 on outward facing surfaces of the panel skins 32 and 34. These markings are configured to aid in aligning the SIP 10 during construction, to prepare for location of various building components, to indicate to a user the location of studs, and/or to aid in determining the desired location of SIPs 10 in a building.

In exemplary embodiments, when SIP 10 is assembled, i.e., when structural member 20 is surrounded by panel insulation 30 and is further covered with interior and exterior panel skins, a user cannot see the components within the panel. And if building components such as electrical wiring and/or conduit have been introduced into framing notches/cross-member voids 37 and chases 28, a user, looking at either interior or exterior SIP 10 skins will not be able to see the added wiring or conduit. Therefore, conduit markings 62, 64, and 66 thus aid the user in knowing where additional conduit or wiring may exist so the user can avoid damaging the additional conduit, wiring, or other construction components during construction. Similarly, stud markings 64 are configured to aid a user in avoiding damage to framing members located within framing notches/cross-member voids 37 in SIP 10 during construction.

In another embodiment, the SIP 10 may be configured to be attached, laminated, layered, stacked, or otherwise joined with standard SIPs or other construction systems. For example, a certain construction project may specify a wall, roof, or floor having a certain thickness where two (2) SIPs 10 or a SIP 10 and another construction system could be integrated to provide such a thickness.

All directional references (e.g., proximal, distal, upper, lower, upward, downward, left, right, lateral, front, back, top, bottom, above, below, vertical, horizontal, clockwise, and counterclockwise) are only used for identification purposes to aid the reader's understanding of the present invention, and do not create limitations, particularly as to the position, orientation, or use of the invention. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. The exemplary drawings are for purposes of illustration only and the dimensions, positions, order and relative sizes reflected in the drawings attached hereto may vary.

The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention. In particular, it should be understood that the described technology may be employed independent of a personal computer. Other embodiments are therefore contemplated. It is intended that all matter contained in the above description and shown in the accompanying drawings shall be interpreted as illustrative only of particular embodiments and not limiting. Changes in detail or structure may be made without departing from the basic elements of the invention as defined in the following claims.

What is claimed is:

1. A structural insulated panel comprising
    a structural member made of a fiber-based, flexible, sheet material in a corrugated form further comprising
        a plurality of front surfaces spaced laterally apart from each adjacent front surface;
        a plurality of back surfaces spaced laterally apart from each adjacent back surface and spaced apart in depth from the plurality of front surfaces; and
        a plurality of chord panels each of which spans between corresponding edges of respective pairs of one of the front surfaces and one of the back surfaces, wherein
        a plurality of chase channels is formed between adjacent pairs of the chord panels and a respective one of the front surfaces or a respective one of the back surfaces; and
        each of the chord panels defines a plurality of apertures along a length of the chord panels configured to substantially equalize a filling pressure within and between the chase channels;
    a front skin panel made of the fiber-based, flexible, sheet material provided directly upon the plurality of front surfaces;
    a back skin panel made of the fiber-based, flexible, sheet material provided directly upon the plurality of rear surfaces; and
    a cohering, insulating filler material that substantially fills the chase channels, adheres to the front surfaces, back surfaces, front skin panel, back skin panel, and chord panels, and extends through the apertures in each of the chord panels, structurally connecting the cohering, insulating filler material in adjacent chase channels to thereby form a monolithic structural bond between the chase channels, the front surfaces and the front skin panel, and the rear surfaces and the rear skin panel;
    wherein the structural insulated panel thus configured is load bearing and exhibits structural rigidity.

2. The structural insulated panel of claim 1, wherein
    a plurality of recesses is defined within the front surfaces and the adjacent chord panels; and
    the structural member further comprises a cross member defining a channel that fits within the plurality of recesses and extends between lateral sides of the structural insulated panel.

3. The structural insulated panel of claim 2, wherein the cross member further defines a plurality of notches configured to interface with the chord panels.

4. The structural insulated panel of claim 1, wherein
a plurality of voids is defined within each of the chord panels adjacent corresponding intersections with the front surfaces; and
the structural member further comprises a cross member defining a channel that fits within the plurality of voids and extends between lateral sides of the structural insulated panel.

5. The structural insulated panel of claim 4, wherein the cross member further defines a plurality of notches configured to interface with the chord panels.

6. The structural insulated panel of claim 1 further comprising an end plate affixed along a top of the structural member, along a bottom of the structural member, or both.

7. The structural insulated panel of claim 6, wherein
a top edge or a bottom edge of one or more of the chord panels extends as a tab;
the end plate defines a notch configured to interface with the tab; and
the tab extends into the notch when the end plate is affixed to the structural member.

8. The structural insulated panel of claim 6, wherein the end plate comprises a framing member.

9. The structural insulated panel of claim 8, wherein one or more of the plurality of front surfaces, the plurality of back surfaces, or both, extends beyond a length of an adjacent chord panel to form a framing extension that interfaces with the framing member.

10. The structural insulated panel of claim 6, wherein the end plate further comprises a plurality of apertures through which the cohering, insulating filler material at least partially extends to engage the end plate.

11. The structural insulated panel of claim 1, wherein each of the front and rear skin panels are congruent in area to an area defined by a perimeter of the structural member on a front side and a back side, respectively.

12. The structural insulated panel of claim 1, wherein the front surfaces and back surfaces further comprise a plurality of holes, respectively, through which the cohesive, insulating filler material extends to engage and adhere to the front skin panel and back skin panel, respectively.

13. A method for constructing a structural insulated panel comprising
forming a fiber-based, flexible, sheet material into a structural member having a corrugated configuration defining
a plurality of front surfaces spaced laterally apart from each adjacent front surface;
a plurality of back surfaces spaced laterally apart from each adjacent back surface and spaced apart in depth from the plurality of front surfaces;
a plurality of chord panels each of which spans between corresponding edges of respective pairs of one of the front surfaces and one of the back surfaces; and
a plurality of chase channels composed of adjacent pairs of the chord panels and a respective one of the front surfaces and a respective one of the back surfaces;
forming a plurality of apertures within each of the plurality of chord panels;
placing a front skin panel made of the fiber-based, flexible, sheet material directly upon the plurality of front surfaces;
placing a back skin panel made of the fiber-based, flexible, sheet material directly upon the plurality of rear surfaces; and
filling the plurality of chase channels with a cohering, insulating filler material such that the cohering, insulating filler material
extends through the apertures in each of the chord panels to substantially equalize a filling pressure within and between the chase channels,
structurally connects the cohering, insulating filler material in adjacent chase channels, and
adheres to the front surfaces, back surfaces, front skin panel, back skin panel, and chord panels to thereby form a monolithic structural bond between the chase channels, the front surfaces and the front skin panel, and the rear surfaces and the rear skin panel;
wherein the structural insulated panel thus formed is load bearing and exhibits structural rigidity.

14. The method of claim 13 further comprising
defining a plurality of recesses within the front surfaces and the adjacent chord panels; and
fitting a cross member defining a channel within the plurality of recesses to extend between lateral sides of the structural insulated panel.

15. The method of claim 14 further comprising
defining a plurality of notches within the cross member configured to interface with the chord panels; and
sliding the cross member into the plurality of recesses such that each notch interfaces with a corresponding chord panel.

16. The method of claim 13 further comprising
defining a plurality of voids within each of the chord panels adjacent to corresponding intersections with the front surfaces; and
fitting a cross member defining a channel within the plurality of voids to extend between lateral sides of the structural insulated panel.

17. The method of claim 16 further comprising
defining a plurality of notches within the cross member further configured to interface with the chord panels;
sliding the cross member through the plurality of voids; and
fitting each of the notches with a corresponding chord panel.

18. The method of claim 13 further comprising affixing an end plate along a top of the structural member, along a bottom of the structural member, or both.

19. The method of claim 18 further comprising
defining a top or bottom edge of one or more of the chord panels to extend as a tab;
defining the end plate as a notch configured to interface with the tab; and
extending the tab into the notch when the end plate is affixed to the structural member.

20. The method of claim 13 further comprising forming one or more of the plurality of front surfaces, one or more of the plurality of back surfaces, or both, to extend beyond a length of an adjacent chord panel to form a framing extension for interfacing with a framing member.

21. The method of claim 13,
wherein
each of the front and rear skin panels are congruent in area to an area defined by a perimeter of the structural member on a front side and a back side, respectively.

22. The method of claim 21 further comprising providing graphic patterns on the front skin panel, the back skin panel, or both.

* * * * *